July 28, 1953 W. W. BOELENS ET AL 2,647,205
CIRCUIT-ARRANGEMENT FOR FREQUENCY TRANSFORMATION
OF HIGH-FREQUENCY OSCILLATIONS
Filed Aug. 2, 1950

INVENTORS
WILLEM WIGGER BOELENS
PIETER ZIJP
BY [signature]
AGENT

Patented July 28, 1953 2,647,205

UNITED STATES PATENT OFFICE 2,647,205

CIRCUIT-ARRANGEMENT FOR FREQUENCY TRANSFORMATION OF HIGH-FREQUENCY OSCILLATIONS

Willem Wigger Boelens and Pieter Zijp, Eindhoven, Netherlands, assignors to Hartford National Bank and Trust Company, Hartford, Conn., as trustee Application August 2, 1950, Serial No. 177,142
In the Netherlands August 9, 1949

2 Claims. (Cl. 250—20)

The present invention relates to circuit arrangements for frequency transformation of high frequencies, and more particularly to mixing circuits comprising a discharge tube which, in addition to a cathode and an anode, have a plurality of grids. The first two grids, as viewed from the cathode, serve as oscillator electrodes for generating local oscillations. The oscillation to be transformed in frequency is supplied to a grid more remote from the cathode, a control voltage also being applied to this grid.

It is known that such arrangements have the disadvantage that a variation in control voltage in the reception of short waves frequently gives rise to an inadmissibly strong variation in oscillator frequency. Various means have previously been suggested for eliminating this disadvantage. For instance, it has been suggested that, in an octode mixing circuit in which the oscillator portion of the tube is separated by a screen grid from the input control grid and in which a screen grid is provided between the input control grid and the anode, compensation of unwanted frequency variations of the oscillator should be brought about by providing a capacitive coupling between the anode and the oscillator portion of the circuit. It is in this case necessary to include a resistance in the anode circuit. A disadvantage of this circuit is that the intermediate-frequency portions of the circuit are comparatively strongly coupled to the oscillator portion of the circuit, which tends to produce whistling and other interferences.

The principal object of the present invention is to provide an improved mixing circuit.

More specifically, it is an object of the invention to provide a high frequency mixing circuit in which the above noted disadvantages are obviated.

Further objects of the invention will appear from the following description.

According to the invention, a further means for suppressing the said disadvantage is provided. More specifically, a grid located close to the control grid is connected through an impedance to the positive terminal of the source of supply voltage and a coupling is provided between the last-mentioned grid and the oscillator portion. This reduces to a considerable extent the variation in oscillator frequency which is due to a variation in control voltage.

The invention is particularly suitable for use in circuits which comprise a tube which have, in the order named, a cathode, an oscillator control grid, an oscillator anode, an electrode connected to the oscillator control grid, a signal control grid, a screen grid and an anode. If desired, a suppressor grid may be interposed between the screen grid and anode. This circuit is distinguished from the ordinary octode mixing circuit in that a screen grid proper is not provided between the oscillator electrodes and the signal control grid of the tube. The second and the third grids are preferably made rod-shaped or plate-shaped and the cathode is of such a shape as to emit substantially to two sides at right angles to the plane of the rods. It has been found that the use of such a tube, when utilizing the invention, provides highly effective suppression of the local oscillator frequency variations.

It may be observed that it is known to provide a capacitive coupling in non-controlled mixing tubes between a positive electrode provided beyond the signal control grid and the oscillator portion. However, the coupling here serves for another purpose and will be proportioned differently from that which is required in gain controlled tubes to obtain optimum compensation of the frequency variation.

In order that the invention may be more clearly understood and readily carried into effect, it will now be described more fully by reference to the accompanying drawing in which.

Figure 1:
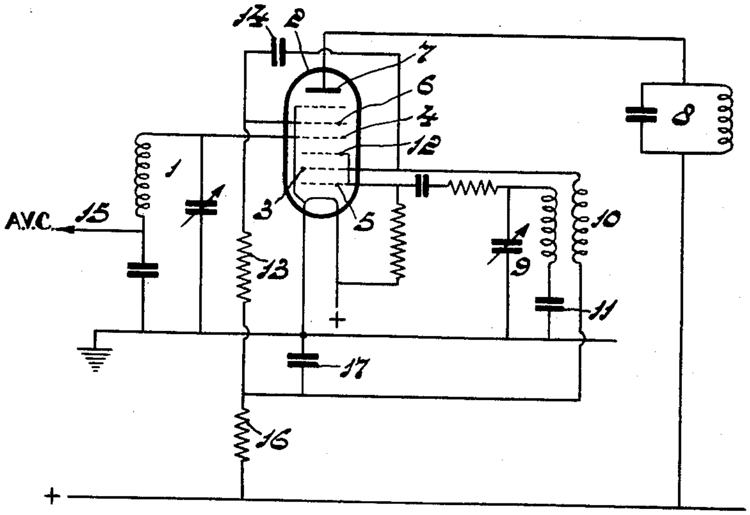
Fig. 1 shows a mixing circuit according to the invention.

Referring now to the drawing and more particularly to Fig. 1, reference numeral 1 designates the signal input circuit. The high-frequency signals produced therein are applied between the cathode and a signal control grid 4 of a mixing tube 2. The anode 7 of this tube is connected to a circuit 8, which is tuned to the intermediate frequency and from which the output voltage is derived. Also applied to the control grid 4 is a control voltage which is supplied through a conductor 15 and which may be, for example, an automatic volume control potential.

Figure 2:
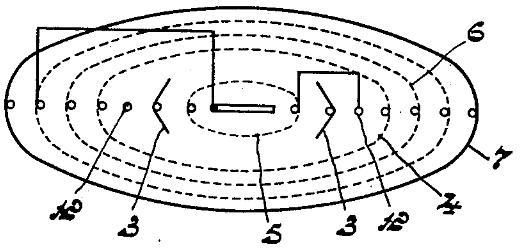
Fig. 2 shows the electrode system of a suitable tube for use in a circuit according to the invention in a section at right angles to the axis.

Grid electrodes 5 and 3, of which the former may be an ordinary grid and the latter may comprise two V-shaped plates, as shown in Fig. 2, serve as oscillator electrodes. For this purpose the grid 5 is connected to a circuit 9 tuned to the oscillator frequency and the anode 3 is connected to an inductance 10 which is coupled to the inductance of the circuit 9. A condenser 11, which is connected in series with the inductance of circuit 9, is proportioned for proper tracking as the circuits 1 and 9 are tuned through their frequency ranges. A further grid electrode 12 is provided between the grids 3 and 4. Grid electrode 12 is internally coupled to grid 5 and is preferably in the form of two rods extending in the plane of the cathode. The grid 6 is a screen grid located between the input grid 4 and the anode 7. Grid 6 acquires a positive voltage across resistances 16 and 13. The current for the electrode 3 is also fed via the resistance 16. The upper extremity of resistance 16 is grounded for high-frequency current by way of a condenser 17. A suppressor grid following the electrode 6 may be connected to the cathode in the usual manner. It is assumed that the cathode is heated directly. It is located in a plane and emits substantially in directions approximately at right angles to this plane. According to the invention, in order to compensate for a variation in oscillator frequency which occurs upon variation in the control voltage at grid 4, a capacity 14 is provided between the grid 6 and the oscillator anode 3, said capacity together with the resistance 13 bringing about coupling between the grid 6 and the oscillator circuit. It has been found that the variation in frequency of the oscillator produced by variation in voltage at the grid 4 may be limited to a great extent. With a value of 470 ohms for the resistance 13 and a value of 8 $\mu\mu$f. for the capacity 14 it has been found that the local oscillator frequency variation upon reception of stations in the 30 meter wave band decreased to one fifth of the initial value. The tube may be of the type DK 40.

While we have described our invention in a specific use thereof and in a specific embodiment, we do not wish to be limited thereto, for obvious modifications will occur to those skilled in the art without departing from the spirit and scope of the invention.

What we claim is:

1. An electrical circuit arrangement for mixing a first wave and a second wave to produce an intermediate frequency wave, comprising an electron discharge tube having in the order named a cathode, first, second, third and fourth grid electrodes and an anode, circuit means intercoupling said cathode and said first and second grid electrodes to generate said first wave, means to apply said second wave to said third grid electrode, means to apply an automatic volume control voltage to said third grid electrode, a source of positive potential, a resistance element intercoupling said fourth grid electrode and said source of positive potential, a capacitive element intercoupling said fourth grid electrode and said second grid electrode to suppress variations in frequency of said first wave upon variation of said control voltage, and an output circuit coupled to said anode.

2. An electrical circuit arrangement for mixing a first wave and a second wave to produce an intermediate frequency wave, comprising an electron discharge tube having in the order named a cathode, an oscillator grid, an oscillator anode, a rod shaped grid electrode connected to said oscillator grid, an input control grid, a screen grid and an anode, circuit means intercoupling said cathode, said oscillator grid and said oscillator anode to generate said first wave, means to apply said second wave to said input control grid, means to apply an automatic volume control voltage to said input control grid, a source of positive potential, a resistance element intercoupling said screen grid and said source of positive potential, a capacitive element intercoupling said screen grid and said oscillator anode to suppress variations in frequency of said first wave upon variations in said control voltage, and an output circuit coupled to said anode.

WILLEM WIGGER BOELENS.
PIETER ZIJP.

References Cited in the file of this patent

UNITED STATES PATENTS

| Number | Name | Date |
|---|---|---|
| 2,153,778 | Travis | Apr. 11, 1939 |
| 2,540,532 | Koch | Feb. 6, 1951 |
| 2,577,489 | Strutt | Dec. 4, 1951 |